United States Patent
Atsmon et al.

(10) Patent No.: US 7,568,963 B1
(45) Date of Patent: Aug. 4, 2009

(54) INTERACTIVE TOYS

(75) Inventors: Alon Atsmon, Yehud (IL); Amit Antebi, Ramat-Gan (IL); Moshe Cohen, Tel-Aviv (IL); Sharon Shimoni, Tel-Aviv (IL)

(73) Assignee: BeepCard Ltd., Tel-Aviv (IL)

( * ) Notice: Subject to any disclaimer, the term of this patent is extended or adjusted under 35 U.S.C. 154(b) by 0 days.

(21) Appl. No.: 09/787,265

(22) PCT Filed: Sep. 16, 1999

(86) PCT No.: PCT/IL99/00506

§ 371 (c)(1),
(2), (4) Date: Mar. 14, 2001

(87) PCT Pub. No.: WO00/15316

PCT Pub. Date: Mar. 23, 2000

(30) Foreign Application Priority Data

| Sep. 16, 1998 | (IL) | ............... PCT/IL98/00450 |
| Oct. 2, 1998 | (IL) | ............... 126444 |
| Nov. 16, 1998 | (IL) | ............... 127072 |
| Dec. 14, 1998 | (IL) | ............... 127569 |

(51) Int. Cl.
*A63H 30/04* (2006.01)
*A63H 30/00* (2006.01)

(52) U.S. Cl. .......... 446/175; 446/297; 446/484

(58) Field of Classification Search ............ 446/175, 446/297, 298, 299, 484
See application file for complete search history.

(56) References Cited

U.S. PATENT DOCUMENTS

| 2,990,646 A | 7/1961 | Berger |
| 3,961,323 A | 6/1976 | Hartkorn |
| 4,207,696 A | 6/1980 | Hyman et al. |
| 4,231,184 A | 11/1980 | Corris et al. |
| 4,264,978 A | 4/1981 | Whidden |
| 4,353,064 A | 10/1982 | Stamm |
| 4,390,877 A | 6/1983 | Curran |
| 4,479,995 A | 10/1984 | Suzuki et al. |
| 4,614,861 A | 9/1986 | Pavlov et al. |
| 4,637,007 A | 1/1987 | Sakurai |
| 4,640,034 A | 2/1987 | Zisholtz |
| 4,641,374 A | 2/1987 | Oyama |

(Continued)

FOREIGN PATENT DOCUMENTS

DE  19645071  5/1998

(Continued)

OTHER PUBLICATIONS

TeleID TM System; "The Technology";http://www.encotone.com/html/tech_def.html; Feb. 2, 1999.

(Continued)

*Primary Examiner*—Kien T Nguyen

(57) ABSTRACT

A plurality of individual toys, at least a first one of which generates acoustic signals and at least a second one of which receives acoustic signals. When the second toy receives acoustic signals from the first toy, it responds, for example, by generating a sound and/or controlling its motion. In a preferred embodiment of the invention, the toys flock and/or form a procession of toys which follow a leader toy, for example a mother goose and a plurality of following and preferably quacking goslings.

76 Claims, 3 Drawing Sheets

U.S. PATENT DOCUMENTS

| | | | |
|---|---|---|---|
| 4,670,746 A | 6/1987 | Taniguchi et al. |
| 4,673,371 A | 6/1987 | Furukawa |
| 4,677,657 A | 6/1987 | Nagata et al. |
| 4,682,370 A | 7/1987 | Matthews |
| 4,696,653 A | 9/1987 | McKeefery |
| 4,716,376 A | 12/1987 | Daudelin |
| 4,717,364 A | 1/1988 | Furukawa |
| 4,766,294 A | 8/1988 | Nara et al. |
| 4,814,591 A | 3/1989 | Nara et al. |
| 4,818,855 A | 4/1989 | Mongeon et al. |
| 4,840,602 A | 6/1989 | Rose |
| 4,851,654 A | 7/1989 | Nitta |
| 4,857,030 A | 8/1989 | Rose |
| 4,874,935 A | 10/1989 | Younger |
| 4,894,663 A | 1/1990 | Urbish et al. |
| 4,918,416 A | 4/1990 | Walton et al. |
| 4,924,075 A | 5/1990 | Tanaka |
| 4,935,907 A | 6/1990 | Friedman |
| 4,942,534 A | 7/1990 | Yokoyama et al. |
| 4,961,229 A | 10/1990 | Takahashi |
| 4,973,286 A | 11/1990 | Davison |
| 4,978,840 A | 12/1990 | Anegawa |
| 4,984,380 A | 1/1991 | Anderson |
| 5,032,099 A | 7/1991 | Chan |
| 5,072,103 A | 12/1991 | Nara |
| 5,085,610 A | 2/1992 | Engel et al. |
| 5,176,560 A | 1/1993 | Wetherell et al. |
| 5,191,615 A | 3/1993 | Aldava et al. |
| 5,209,695 A | 5/1993 | Rothschild |
| 5,241,160 A | 8/1993 | Bashan et al. |
| 5,280,267 A | 1/1994 | Reggiani |
| 5,280,527 A | 1/1994 | Gullman et al. |
| 5,289,273 A | 2/1994 | Lang |
| 5,307,051 A | 4/1994 | Sedlmayr |
| 5,314,336 A | 5/1994 | Diamond et al. |
| 5,324,038 A | 6/1994 | Sasser |
| 5,356,326 A | 10/1994 | Ting |
| 5,376,778 A | 12/1994 | Kreft |
| 5,407,376 A | 4/1995 | Avital et al. |
| 5,416,829 A | 5/1995 | Umemoto |
| 5,420,606 A | 5/1995 | Begum et al. |
| 5,423,073 A | 6/1995 | Ogawa |
| 5,434,398 A | 7/1995 | Goldberg |
| H1469 H | 8/1995 | Simonoff |
| 5,452,901 A | 9/1995 | Nakada et al. |
| 5,467,095 A | 11/1995 | Rodal et al. |
| 5,479,408 A | 12/1995 | Will |
| 5,517,194 A | 5/1996 | Carroll et al. |
| 5,522,089 A | 5/1996 | Kikinis et al. |
| 5,523,749 A | 6/1996 | Cole et al. |
| 5,539,819 A | 7/1996 | Sonoyama et al. |
| 5,552,790 A | 9/1996 | Gunnarsson |
| 5,579,537 A | 11/1996 | Takahisa |
| 5,583,933 A | 12/1996 | Mark |
| 5,606,732 A | 2/1997 | Vignone, Sr. |
| 5,623,552 A | 4/1997 | Lane |
| 5,629,867 A | 5/1997 | Goldman |
| 5,629,981 A | 5/1997 | Nerlikar |
| 5,635,701 A | 6/1997 | Gloton |
| 5,638,047 A | 6/1997 | Orloff et al. |
| 5,638,450 A | 6/1997 | Robson |
| 5,640,003 A | 6/1997 | Makino |
| 5,646,907 A | 7/1997 | Maccabee |
| 5,647,787 A | 7/1997 | Raviv et al. |
| 5,655,945 A | 8/1997 | Jani |
| 5,697,829 A | 12/1997 | Chainani et al. |
| 5,698,836 A | 12/1997 | Fujioka |
| 5,708,853 A | 1/1998 | Sanemitsu |
| 5,717,168 A | 2/1998 | Debuisser et al. |
| 5,719,387 A | 2/1998 | Fujioka |
| 5,731,757 A | 3/1998 | Layson, Jr. |
| 5,740,232 A | 4/1998 | Pailles et al. |
| 5,742,677 A | 4/1998 | Pinder et al. |
| 5,745,555 A | 4/1998 | Mark |
| 5,752,880 A | 5/1998 | Gabai et al. |
| 5,761,606 A | 6/1998 | Wolzien |
| 5,763,862 A | 6/1998 | Jachimowicz et al. |
| 5,764,512 A | 6/1998 | Michel et al. |
| 5,764,763 A | 6/1998 | Jensen et al. |
| 5,764,900 A | 6/1998 | Morris et al. |
| 5,774,791 A | 6/1998 | Strohallen et al. |
| 5,778,071 A | 7/1998 | Caputo et al. |
| 5,778,187 A | 7/1998 | Monteiro et al. |
| 5,786,764 A | 7/1998 | Engellenner |
| 5,786,988 A | 7/1998 | Harari |
| 5,789,733 A | 8/1998 | Jachimowicz et al. |
| 5,793,305 A | 8/1998 | Turner et al. |
| 5,800,243 A | 9/1998 | Berman |
| 5,805,676 A | 9/1998 | Martino |
| 5,809,245 A | 9/1998 | Zenda |
| 5,815,020 A | 9/1998 | Allen et al. |
| 5,818,030 A | 10/1998 | Reyes |
| 5,825,871 A | 10/1998 | Mark |
| 5,831,520 A | 11/1998 | Stephan |
| 5,847,662 A | 12/1998 | Yokota et al. |
| 5,847,752 A | 12/1998 | Sebestyen |
| 5,850,077 A | 12/1998 | Tognazzini |
| 5,854,589 A | 12/1998 | How et al. |
| 5,859,913 A | 1/1999 | Goreta et al. |
| 5,861,841 A | 1/1999 | Gildea et al. |
| 5,864,794 A | 1/1999 | Tasaki |
| 5,870,155 A | 2/1999 | Erlin |
| 5,878,142 A | 3/1999 | Caputo et al. |
| 5,880,769 A | 3/1999 | Nemirofsky et al. |
| 5,881,149 A | 3/1999 | Weatherill |
| 5,884,271 A | 3/1999 | Pitroda |
| 5,903,721 A | 5/1999 | Sixtus |
| 5,905,865 A | 5/1999 | Palmer et al. |
| 5,907,142 A | 5/1999 | Kelsey |
| 5,914,980 A | 6/1999 | Yokota et al. |
| 5,921,674 A | 7/1999 | Koczi |
| 5,955,961 A | 9/1999 | Wallerstein |
| 5,963,643 A | 10/1999 | Goreta et al. |
| 5,986,562 A | 11/1999 | Nikolich |
| 5,987,509 A | 11/1999 | Portuesi |
| 6,005,548 A | 12/1999 | Latypov et al. |
| 6,010,074 A | 1/2000 | Kelly et al. |
| 6,014,083 A | 1/2000 | Bauerschmidt et al. |
| 6,016,476 A | 1/2000 | Maes et al. |
| 6,018,641 A | 1/2000 | Tsubouchi et al. |
| 6,019,285 A | 2/2000 | Isobe et al. |
| 6,021,119 A | 2/2000 | Derks et al. |
| 6,023,509 A | 2/2000 | Herbert et al. |
| 6,023,779 A | 2/2000 | Fullam et al. |
| 6,036,099 A | 3/2000 | Leighton |
| 6,058,373 A | 5/2000 | Blinn et al. |
| 6,060,332 A | 5/2000 | Martin |
| 6,068,192 A | 5/2000 | McCabe et al. |
| 6,079,621 A | 6/2000 | Vardanyan et al. |
| 6,081,782 A | 6/2000 | Rabin |
| 6,089,942 A * | 7/2000 | Chan ........................ 446/175 |
| 6,097,292 A | 8/2000 | Kelly et al. |
| 6,098,106 A | 8/2000 | Philyaw et al. |
| 6,110,000 A * | 8/2000 | Ting ........................ 446/302 |
| 6,119,228 A | 9/2000 | Angelo et al. |
| 6,125,172 A | 9/2000 | August et al. |
| 6,125,452 A | 9/2000 | Kuriyama |
| 6,149,490 A * | 11/2000 | Hampton et al. ............ 446/353 |
| 6,176,837 B1 | 1/2001 | Foxlin |
| 6,182,044 B1 | 1/2001 | Fong et al. |
| 6,186,396 B1 | 2/2001 | Crandall, Jr. |
| 6,189,096 B1 | 2/2001 | Haverty |
| 6,194,993 B1 | 2/2001 | Hayashi et al. |
| 6,195,693 B1 | 2/2001 | Berry et al. |

| | | |
|---|---|---|
| 6,211,858 B1 | 4/2001 | Moon et al. |
| 6,222,880 B1 | 4/2001 | Eastmond et al. |
| 6,233,736 B1 | 5/2001 | Wolzien |
| 6,236,724 B1 | 5/2001 | Labaton et al. |
| 6,237,026 B1 | 5/2001 | Prasad et al. |
| 6,244,260 B1 * | 6/2001 | Ragoza et al. ............... 124/34 |
| 6,248,946 B1 | 6/2001 | Dwek |
| 6,257,486 B1 | 7/2001 | Teicher et al. |
| 6,272,228 B1 | 8/2001 | Martin |
| 6,289,114 B1 | 9/2001 | Mainguet |
| 6,292,437 B1 | 9/2001 | Beard |
| 6,309,275 B1 * | 10/2001 | Fong et al. ............... 446/297 |
| 6,331,972 B1 | 12/2001 | Harris et al. |
| 6,332,163 B1 | 12/2001 | Bowman-Amuah |
| 6,360,953 B1 | 3/2002 | Lin et al. |
| 6,377,670 B1 | 4/2002 | Rosset et al. |
| 6,380,844 B2 * | 4/2002 | Pelekis ...................... 340/5.8 |
| 6,385,314 B1 | 5/2002 | Furuya |
| 6,389,055 B1 | 5/2002 | August et al. |
| 6,389,935 B1 | 5/2002 | Azima et al. |
| 6,392,960 B1 | 5/2002 | Seltzer et al. |
| 6,393,126 B1 | 5/2002 | Van der Kaay et al. |
| 6,400,996 B1 | 6/2002 | Hoffberg et al. |
| 6,404,877 B1 | 6/2002 | Bolduc et al. |
| 6,445,780 B1 | 9/2002 | Rosset et al. |
| 6,513,015 B2 | 1/2003 | Ogasawara |
| 6,519,564 B1 | 2/2003 | Hoffberg et al. |
| 6,547,130 B1 | 4/2003 | Shen |
| 6,556,768 B1 | 4/2003 | Nakajima et al. |
| 6,556,965 B1 | 4/2003 | Borland et al. |
| 6,559,755 B1 | 5/2003 | Hamamoto et al. |
| 6,570,490 B1 | 5/2003 | Saitoh et al. |
| 6,594,052 B2 | 7/2003 | Hiramatsu et al. |
| 6,607,136 B1 | 8/2003 | Atsmon et al. |
| 6,628,240 B2 | 9/2003 | Amadeo |
| 6,641,374 B2 | 11/2003 | Kim |
| 6,647,063 B1 | 11/2003 | Oikawa |
| 6,648,719 B2 * | 11/2003 | Chan ....................... 446/297 |
| 6,661,563 B2 | 12/2003 | Hayashi et al. |
| 6,681,008 B2 | 1/2004 | Bolduc et al. |
| 6,704,715 B1 | 3/2004 | Rosset et al. |
| 6,758,404 B2 | 7/2004 | Ladyansky |
| 6,760,276 B1 * | 7/2004 | Karr ....................... 367/197 |
| 6,766,946 B2 | 7/2004 | Lida et al. |
| 6,823,452 B1 | 11/2004 | Doyle et al. |
| 6,934,848 B1 | 8/2005 | King et al. |
| 6,976,164 B1 | 12/2005 | King et al. |
| 6,982,649 B2 | 1/2006 | Blum et al. |
| 7,013,301 B2 | 3/2006 | Holm et al. |
| 7,058,376 B2 | 6/2006 | Logan et al. |
| 7,080,253 B2 | 7/2006 | Weare |
| 7,183,929 B1 | 2/2007 | Antebi et al. |
| 7,260,221 B1 | 8/2007 | Atsmon |
| 7,280,970 B2 | 10/2007 | Tamir et al. |
| 7,334,735 B1 | 2/2008 | Antebi et al. |
| 2001/0047486 A1 | 11/2001 | Green et al. |
| 2001/0055202 A1 | 12/2001 | Templeton et al. |
| 2002/0019939 A1 | 2/2002 | Yamamoto et al. |
| 2002/0112171 A1 | 8/2002 | Ginter et al. |
| 2002/0156917 A1 | 10/2002 | Nye |
| 2002/0157034 A1 | 10/2002 | Sagar |
| 2002/0169608 A1 | 11/2002 | Tamir et al. |
| 2003/0159040 A1 | 8/2003 | Hashimoto et al. |
| 2004/0031856 A1 | 2/2004 | Atsmon et al. |
| 2004/0220807 A9 | 11/2004 | Tamir et al. |
| 2004/0236819 A1 | 11/2004 | Anati et al. |
| 2004/0260556 A1 | 12/2004 | Hoffberg et al. |
| 2005/0044561 A1 | 2/2005 | McDonald |
| 2005/0172137 A1 | 8/2005 | Hopkins |
| 2006/0136544 A1 | 6/2006 | Atsmon et al. |
| 2006/0229114 A2 | 10/2006 | Kim |
| 2006/0271646 A1 | 11/2006 | Janky et al. |
| 2006/0288374 A1 | 12/2006 | Ferris et al. |
| 2007/0112566 A1 | 5/2007 | Chen |
| 2008/0034410 A1 | 2/2008 | Udupa et al. |
| 2008/0071537 A1 | 3/2008 | Tamir et al. |

FOREIGN PATENT DOCUMENTS

| | | |
|---|---|---|
| EP | 0526015 | 2/1993 |
| EP | 0789320 | 8/1997 |
| GB | 2236258 | 4/1991 |
| GB | 2236258 A * | 4/1991 |
| JP | 62-060076 | 3/1987 |
| JP | 01-226091 | 8/1989 |
| JP | 07-087234 | 3/1995 |
| WO | WO 93/11619 | 6/1993 |
| WO | WO 93/21720 | 10/1993 |
| WO | WO 94/17498 | 8/1994 |
| WO | WO 96/10880 | 4/1996 |
| WO | WO 97/15899 | 5/1997 |
| WO | WO 97/16049 | 5/1997 |
| WO | WO 98/12670 | 3/1998 |
| WO | WO 98/57474 | 12/1998 |
| WO | WO 99/22362 | 5/1999 |
| WO | WO 99/23804 | 5/1999 |
| WO | WO 00/01456 | 1/2000 |
| WO | WO 00/15316 | 3/2000 |
| WO | WO 00/21020 | 4/2000 |
| WO | WO 00/21203 | 4/2000 |
| WO | WO 00/29920 | 5/2000 |
| WO | WO 00/77751 | 12/2000 |
| WO | WO 01/82223 | 11/2001 |
| WO | WO 02/14974 | 3/2002 |
| WO | WO 02/076717 | 10/2002 |
| WO | WO 02/078199 | 10/2002 |

OTHER PUBLICATIONS

Ahuja et al. "An Analog Front End for a Two-Chip 2400-Bit/s Voice-Band Modem", Intel Corporation, IEEE Journal of Solid-State Circuits, 22(6): 996-1003, 1987. Abstract.

Encotone "The Technology", TeleIDTM System, Encotone Ltd., 8 P., Retrieved From the Internet: <http://web.archive.org/web/19981205063057/www.encotone.com/html/tech_def.html>, 1998.

Encotone Encotone, Ltd.—Corporate Background, 2 P., 1998. Retrieved From the Internet: <http://web.archive.org/web/19981205164055/www.encotone.com/html/comp_def.html>.

* cited by examiner

INTERACTIVE TOYS

RELATED APPLICATIONS

The present application is a U.S. national application of PCT/IL99/00506, filed 16 Sep. 1999.

FIELD OF INVENTION

The present invention relates generally to toys and/or other devices that interact among themselves, especially using acoustic transmissions.

BACKGROUND OF THE INVENTION

U.S. Pat. Nos. 5,191,615 and 4,840,602 describe toys that respond to signals transmitted from a different location. In one example, the signals are RF signals. In another example the signals are encoded light modulations which are carried as part of a TV transmission or as part of a video recording. The disclosures of all the patents and publications mentioned herein are incorporated herein by reference.

U.S. Pat. No. 5,752,880 and a corresponding PCT publication describe toys having a two way communication link with a computer. This link may be used to provide instructions and also to download programming to the toy.

U.S. Pat. No. 5,655,945 describes a set of one or more toys that are controlled by a RF signal transmission. The signal is decoded from a vertical blank period signal of a children's movies and the actions of one or more toys (sounds, motion), are synchronized with the movie using the transmission.

Outside of the toy-field, mechanical models of populations of animals have been constructed. In a particular example, a population of mechanical toads has been constructed to analyze and display the interactive behavior of such animals, for example setting of croaking sound levels.

However, a child often plays with a plurality of toys and simulates interaction between them.

SUMMARY OF THE INVENTION

One object of some preferred embodiments of the invention is to provide toys which interact directly with each other, preferably enhancing the pleasure of a child playing with the toys. In a preferred embodiment of the invention, the toys comprise action figures, animal figures and/or dolls. Preferably, there is a conceptual relationship between the interacting toys, for example "mother and baby" or "horse and rider", however, this is not required in all the preferred embodiments of the invention.

One aspect of some preferred embodiments of the present invention is related to toys which purposely transmit and receive signals between them. The signals may be part of a complex interaction involving many related signals, for example, confirmations, queries and replies. Alternatively or additionally, the signals may be simple two-part communications, for example toy "A" tells toy "B" to jump and in response toy "B" jumps and/or squeaks. Two types of signals which can be transmitted between toys should be differentiated. A first type of signal directs the behavior of one toy by another. A second type of signal is one which is passed through the toy, for example in toy walkie-talkies. In a preferred embodiment of the invention, the signals are transmitted directly between the toys. Alternatively or additionally, the toys are connected to a communications network. The network may have a star topology, for example, with at least some of the toys transmitting signals through a hub (e.g., a computer, especially a personal computer or a PDA). Alternatively or additionally, the topology may allow toys to forward signals from one toy to the next. In a preferred embodiment of the invention, a signal generated by a toy is intended for a destination toy and may include an indication of that destination toy. Alternatively or additionally, the signals may be multi-cast. Alternatively or additionally, each toy may choose which signals to detect and/or respond to.

An aspect of some preferred embodiments of the invention relates to communication between toys using sounds. Alternatively or additionally to communications using RF; magnetic fields; variable signaling, preferably, low frequency, visible signaling such as by moving appendages; IR; and visible light, toys may communicate using acoustics. In a preferred embodiment of the invention, the sounds used for communications are incorporated in sounds used for play. In one example, one toy generates vocal output towards another toy (talking) and the other toy responds to the vocal output. In a preferred embodiment of the invention, the incorporation is by recognition of the characteristics of the play sound. Alternatively or additionally, the signal is overlaid on the sound as a modulation or appended to it, for example as a beep. Alternatively or additionally, the sounds are inaudible, for example being ultrasonic or infrasonic. Alternatively or additionally, the sounds are inadvertently created when the toy acts, for example, a stomping sound caused by the walking of a first toy may be detected by a second toy, as a signal to respond to.

An aspect of some preferred embodiment of the invention relates to sets of toys that are designed to respond to each other. In a preferred embodiment of the invention, the set includes two, three four or even over ten individual toys. In one example, such a set may include a mother goose and three goslings. When the mother goose quacks and starts walking, the goslings can also quack and start walking after the mother goose. In another example, the set includes a plurality of toy soldiers. Preferably, the soldiers are divided into two groups. Within each group the toys preferably act as a unit, e.g., advance in a synchronized manner. When a soldier from one unit "fires" at a soldier from a second unit, the second soldier preferably responds by shouting out and falling and/or becoming inactive. Soldier units, action figures and other toys, especially those emulating human or living creatures, typically, but not necessarily include segments which can be moved by the player, for example arms, legs and weapons.

An aspect of some preferred embodiments of the invention relates to allowing and generating un-predicted and/or complex interactions between toys. In a preferred embodiment of the invention, each toy receives, transmits and/or responds to signals using a relatively simple logic. However, since there are many toys, with many possible relative positions, relatively simple logic rules may exhibit seemingly complex behavior patterns. In the animal world, such behavior is exhibited by ants, where each ant is relatively simple, but the anthill as a whole exhibits very complex behavior.

An aspect of some preferred embodiments of the invention relates to facilitating interaction between remote players, via interacting toys. In one example, if a first player is playing with two toys "A" and "B", and toy "A" talks to toy "B", a vocal response for toy "B" may be generated by a second player. In the example of the soldiers described above, one unit of soldiers may be controlled from a remote location, such as another room, possibly using a second player. The control may be exercised by the second player using a computer. Additionally or alternatively, the second player may interact with his toys and this interaction and/or its results being transmitted to the unit of soldiers. In one example, the transmission uses an Internet connection, so that the two players can even be on opposite sides of the world.

An aspect of some preferred embodiments of the invention relates to simple and relatively cheap interactive toys. In a preferred embodiment of the invention, the toys are controlled using a simple micro-controller and communicate using acoustic waves. Such communication is generally significantly cheaper than RF or IR communications. Additionally, such communication does not require a meditating computer, in accordance with some preferred embodiments of the invention, so that software and/or hardware installation on a computer is not required. Even when RF communication is used, short range and/or low frequency radiation is preferably used, to reduce radiation danger, however, this is not essential.

An aspect of some preferred embodiments of the invention relates to interfacing a toy and/or other device with a computer system without installing hardware on the computer. In one example, using a computer having installed thereon a sound card with a microphone and/or loudspeakers, the loudspeakers are used to interrogate an identification device, using ultrasound. In another example, such interrogation is used to determine distance from and/or location of a toy. Preferably, the computer's microphone is used to detect a response from the interrogated device. In some embodiments, especially for toys, the interrogation may comprise audible sounds.

There is thus provided in accordance with a preferred embodiment of the invention, a toy kit comprising:

a first toy having a first function, which toy generates acoustic signals; and at least one second toy having a second function different from said first function, which second toy receives the acoustic signals and utilizes the signals to perform said second function. Preferably, said acoustic signals are audible. Alternatively, said acoustic signals are ultrasonic.

In a preferred embodiment of the invention, said toys are child-safe. Alternatively or additionally, said toys are toddler-safe. Alternatively or additionally, said toys are baby-safe.

In a preferred embodiment of the invention, said acoustic signals are indirectly generated by motion of at least a part of said first toy.

In a preferred embodiment of the invention, said toys have external forms matching said functions. Alternatively or additionally, said toys are operative to move in a manner matching said functions. Alternatively or additionally, said toys are operative to generate sounds in a manner matching said functions.

In a preferred embodiment of the invention, said first function comprises a leader function, and wherein said second function comprises a following function, which function exhibits locomotion which follows locomotion of said first toy. Alternatively or additionally, said first function comprises a mother-emulating function and wherein said second function comprises a child-emulating function. Alternatively, said functions comprise different toy-soldier functions. Alternatively, said functions comprise emulations of different farm-animals.

Alternatively or additionally, said first function comprises an emulation of a sheep-dog and wherein said second function comprises an emulation of a sheep.

In an alternative preferred embodiment of the invention, neither of said first and second functions designates one toy as a hierarchical superior of the other toy.

In a preferred embodiment of the invention, each of such functions comprises an emulation of a speaker in an interactive conversation between figures represented by the two toys.

In a preferred embodiment of the invention, said second function exhibits a response to an exhibition of said first function. Preferably, said response comprises a generation or modulation of locomotion of said second toy. Preferably, said locomotion is directed towards said first toy. Alternatively, said locomotion is directed away from said first toy. Alternatively or additionally, said response comprises a modulation or generation of sound by said second toy. Alternatively or additionally, said response comprises a modulation or generation of light by said second toy. Alternatively or additionally, said response comprises a generation or modulation of motion of a segment of said second toy. Alternatively or additionally, said response is dependent on a relative position of said toys. Preferably, said distance is determined by said second toy analyzing said acoustic signals.

Alternatively or additionally, said response is dependent on a relative orientation of at least one of said toys relative to the other one. Preferably, said orientation is determined by said second toy analyzing said acoustic signals.

Alternatively or additionally, said response is dependent on a functional state of at least one of said toys. Preferably, said response is dependent on a functional state of the first toy. Alternatively or additionally, said response is dependent on a functional state of the second toy. Alternatively or additionally, said functional state comprises motion. Alternatively or additionally, said functional state is determined by said second toy analyzing said acoustic signals.

In a preferred embodiment of the invention, said at least a second toy comprises at least two interacting child-safe toys. Alternatively or additionally, said at least a second toy comprises at least four interacting child-safe toys. Alternatively or additionally, said at least a second toy comprises at least seven interacting child safe toys. Alternatively or additionally, said at least a second toy comprises at least ten interacting child-safe toys.

In a preferred embodiment of the invention, said interacting toys interact in a linear network-configuration, each toy interacting with a previous toy in said network.

There is also provided in accordance with a preferred embodiment of the invention, a toy kit comprising:

a first child-safe toy which generates ultrasonic signals; and at least a second child-safe toy which receives the signals and exhibit a behavior, responsive to said signals. Preferably, said behavior is exhibited responsive to a content encoded in said signals. Alternatively or additionally, said behavior is exhibited responsive to an existence of said signals.

There is also provided in accordance with a preferred embodiment of the invention, a toy kit comprising:

a first child-safe toy which indirectly generates acoustic signals, by motion of at least parts thereof; and at least a second child-safe toy which receives the signals and utilizes the signals to exhibit a behavior, responsive to said signals. Preferably, said indirect acoustic signals are generated by a rattle attached to said first toy. Alternatively or additionally, said indirect acoustic signals are generated by a contact or a portion of said first toy with a ground surface which supports said first toy.

In a preferred embodiment of the invention, said behavior comprises locomotion of said second toy. Alternatively or additionally, said first toy further responds to said exhibited behavior of said second toy.

There is also provided in accordance with a preferred embodiment of the invention, a toy kit comprising:

a first child-safe toy which generates signals and exhibits a first behavior; and at least one second child-safe toy which receives the signals exhibits a second behavior, responsive to said first behavior, using said signals to determine said second behavior to exhibit. Preferably, said second toy transmits additional signals to said first toy, which said first toy exhibit a third behavior responsive to said second behavior, said first toy using said additional signals to determine which third behavior to exhibit. Alternatively or additionally, said second behavior comprises movement of the toy. Alternatively or additionally, said second behavior comprises generating sounds.

In a preferred embodiment of the invention, said second toy receives said signals directly from said first toy. Alternatively or additionally, said second toy receives said signals via an intermediate device. Preferably, said intermediate device comprises a third toy. Alternatively, said intermediate device comprises a computer. Alternatively, said intermediate device comprises at least two computers connected by a network.

In a preferred embodiment of the invention, said first and second toys are operative to operate when separated by at least 2 meters. Alternatively or additionally, said first and second toys are operative to operate when separated by at least 5 meters. Alternatively or additionally, said first and second toys are operative to operate when separated by at least 100 meters.

In a preferred embodiment of the invention, said signals comprise acoustic signals. Preferably, said signals comprise ultrasonic signals.

In a preferred embodiment of the invention, said signals comprise an overlay on toy-play related sounds.

In a preferred embodiment of the invention, said signals comprise encoded signals. Alternatively or additionally, said signals are digitally encoded. Alternatively or additionally, said signals comprise electromagnetic signals. Preferably, said signals comprise RF signals. Alternatively or additionally, said signals comprise light signals. Preferably, said signals comprise visible light signals.

In a preferred embodiment of the invention, said at least one second child-safe toy comprises at least four child-safe toys. Preferably, said at least four toys exhibit interacting behavior.

In a preferred embodiment of the invention, said first toy is covered with a soft fur. Alternatively or additionally, said first toy comprises an action figure.

There is also provided in accordance with a preferred embodiment of the invention, a method of playing, comprising:

first interacting, by a player, with a first toy at a first location; and exhibiting of behavior of a second toy at a second, remote, location, responsive to said first interaction. Preferably, the method comprises:

second interacting, with a second player, with the second toy at the second location, responsive to said behavior. Alternatively or additionally, said first and second toys communicate via a computer network. Preferably, said computer network comprises an Internet.

In a preferred embodiment of the invention, wherein said second toy represents said first toy at said second location and wherein said second interacting comprises interacting with a third toy, which third toy interacts with said second toy locally, an indication of which interaction is transmitted to said first location, whereby said third toy effectively interacts with said first toy.

In a preferred embodiment of the invention, an indication of said first interaction is exhibited by a computer at said second location, and said second toy interacts with said computer.

There is also provided in accordance with a preferred embodiment of the invention, a method of interacting between a computer and a toy, comprising:

transmitting sounds from a computer to a toy; and exhibiting behavior by said toy responsive to said transmission. Preferably, said sounds encode a behavioral program for said toy. Alternatively or additionally, said sounds comprise a real-time signal to which said toy responds. Alternatively or additionally, said sounds are synchronized with a display on said computer screen.

In a preferred embodiment of the invention, the method comprises transmitting second sounds from said toy back to said computer, responsive to said sounds. Alternatively or additionally, said second sounds comprises an indication of results of play, by a player, with the toy.

In a preferred embodiment of the invention, said toy comprises a plurality of toys whose behavior is synchronized by said sound transmission.

In a preferred embodiment of the invention, said sounds comprise ultrasonic signals.

There is also provided in accordance with a preferred embodiment of the invention, a method of interacting between a computer and a toy, comprising:

transmitting sounds from a toy to a computer; and exhibiting behavior by said computer responsive to said transmission. Preferably, said toy comprises a play implement. Preferably, said implement comprises a game controller. Alternatively, said implement comprises a bat. Alternatively, said implement comprises a glove.

In a preferred embodiment of the invention, said sounds control, in real-time, at least one object on a display of said computer. Preferably, said at least one object is an element in a game program being executed on said computer.

In a preferred embodiment of the invention, said sounds are sounds indirectly generated by the toy in association with usage thereof. Preferably, said indirect sounds comprise ground-hitting sounds. Alternatively or additionally, said indirect sounds comprise motion-related sounds. Alternatively or additionally, said indirect sounds comprise object collision sounds.

In a preferred embodiment of the invention, said sounds encode information. Preferably, said sounds digitally encode information.

In a preferred embodiment of the invention, said sounds comprise ultrasonic sounds. Preferably, said ultrasonic sounds are processed using a music-oriented sound card of said computer. Alternatively or additionally, said sounds are detected using a standard audio-frequency microphone of said computer. Alternatively or additionally, the method comprises generating additional ultrasonic sounds by said computer, using an audio-frequency speaker of said computer, responsive to said sounds.

In a preferred embodiment of the invention, said sounds are processed by said computer to determine at least one relative spatial property of said computer and said toy. Alternatively or additionally, said sounds are processed by said toy to determine at least one relative spatial property of said computer and said toy.

In a preferred embodiment of the invention, said spatial property comprises a relative distance. Alternatively or additionally, said spatial property comprises a relative position. Alternatively or additionally, said spatial property comprises a relative orientation.

There is also provided in accordance with a preferred embodiment of the invention, a method of communicating between a computer and a toy, comprising:

generating an RF signal using a speaker of said computer; and detecting said RF signal by a child-safe toy. Preferably, the method comprises processing said signal to determine a relative spatial property of said toy and said speaker.

There is also provided in accordance with a preferred embodiment of the invention, a toy comprising of:
a toy portion;
a microphone; and
a signal responding portion comprising essentially of:
a power source; and
an integrated circuit which receives signals from said microphone and controls said toy portion to respond thereto. Preferably, the toy comprises:
an interfacing circuit between said microphone and said integrated circuit; and
an interfacing circuit between said integrated circuit toy portion.

In a preferred embodiment of the invention, said integrated circuit receives said signals, in analog form into a digital port thereof.

There is also provided in accordance with a preferred embodiment of the invention, a toy network comprising:
a central station at a first location, which generates a transmission; and
a plurality of toys at a plurality of second locations, which receive said transmission. Preferably, said toys generate a human-noticeable indication when receiving said transmission. Alternatively or additionally, said toys receive said transmission via an intervening computer. Alternatively or additionally, said toys receive said transmission via a radio broadcast. Preferably, said radio broadcast comprises a DAB (Digital Audio Broadcast).

In a preferred embodiment of the invention, a same transmission is transmitted to all of said toys. Alternatively, different transmissions are transmitted to different ones of said toys.

In a preferred embodiment of the invention, said toys transmit feedback, responsive to an interaction with them by a user, to said central station. Preferably, a same transport method is used for both transmission directions between said toy and said central station. Alternatively, a different transport method is used for different transmission directions between said toy and said central station.

In a preferred embodiment of the invention, said toy comprises a quiz displaying toy and wherein said transmission comprises quiz questions or answers to quiz questions. Alternatively or additionally, said toy analyses said transmission to generate an indication to a user of said toy, which indication is responsive an interaction by said user with said toy.

BRIEF DESCRIPTION OF THE DRAWINGS

The invention will be more clearly understood with reference to the following detailed descriptions of non-limiting preferred embodiments of the invention in which.

DETAILED DESCRIPTION OF PREFERRED EMBODIMENTS

Figure 1:
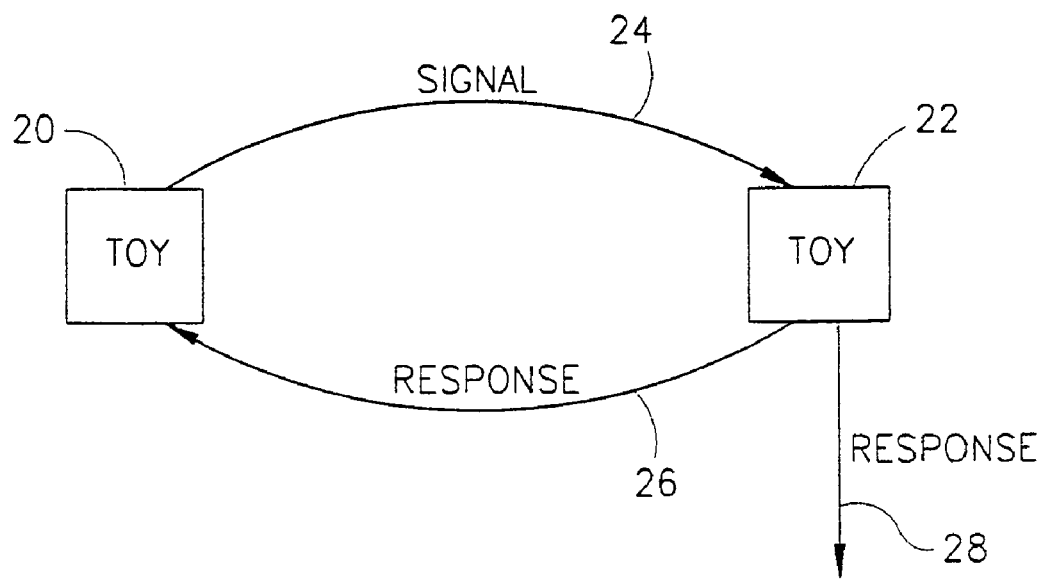
FIG. 1 is a schematic block diagram of two interacting toys, in accordance with a preferred embodiment of the invention.

FIG. 1 is a schematic block diagram of two interacting toys, in accordance with a preferred embodiment of the invention. A toy 20 generates a signal which is detected by a toy 22. Toy 22 generates a response 26, back to toy 20. Toy 20 may then generate a further signal, in response to detecting or not detecting response 26. Additionally or alternatively, toy 22 generates a response 28 which is not directed towards toy 20. In a preferred embodiment of the invention, each of toys 20 and 22 comprise individual toys, for example, action figures, dolls, plastic animals (optionally coated with a soft fur) and/or toy soldiers. In some preferred embodiments of the invention, the individual toys may be physically coupled together, for example, a plurality of action figures are all coupled to a base plate. Preferably, the toys are constructed to be child-toddler or baby safe. These designations relate to features of construction which allow these toys to be packaged for sale to various ages of children, with reasonable expectation that the toy will not damage the child. Also, such toys may be required to withstand certain environments, such as drooling and being slept on. Typically in such toys, but not necessarily, electronic and logic portions and compartmentalized deep inside the toy, so that they will not be inadvertently (from a parent's point of view) interfered with. It should be noted that the art of designing and constructing toys to be child safe at various safety levels is a well developed art and may be applied to various embodiments as described herein.

In a preferred embodiment of the invention, signal 24 comprises an acoustic signal. Such a signal may be audible or inaudible, for example being ultrasonic or infrasonic. Additionally or alternatively, the signals may comprise IR, RF, low frequency magnetic fields and/or electrostatic fields. Additionally or alternatively, signal 24 may be a passive signal and/or response to a probe by toy 22, for example an RF probe wave, which is responded to by a frequency doubling.

PCT application PCT/IL98/00450, titled "The Control of Toys and Devices by Sounds", filed Sep. 16, 1998, in the Israeli receiving office, the disclosure of which is incorporated herein by reference, describes sound actuated toys. In particular, the application describes various sound makers which generate sounds inadvertently as a result of motion, for example beads in a box or crinkle material. In a preferred embodiment of the invention, such a sound maker is connected to and/or mounted on toy 20, so that when toy 20 moves a signal will be generated for toy 22. This PCT application also describes detecting the direction and/or position of a sound, using directional microphones and/or a stereophonic microphone including two or more microphone elements. Additionally or alternatively, a relative distance is determined based on an amplitude of the sound.

In a preferred embodiment of the invention, the sounds (or other signals) are automatically generated by toy 20, for example on a random- or a periodic-basis. Additionally or alternatively, the sounds may be caused by a player, for example by a player activating toy 20.

In a preferred embodiment of the invention, toy 20 comprises a "mama doll" and toy 22 comprises a "baby doll". In a conventional scenario, a child will hold one doll in each hand and generate pretend conversation between them. In a preferred embodiment of the invention, each doll generates conversation sentences in response to conversation sentences uttered by the other doll. The conversation may be initiated by pressing a button on one doll, by their proximity and/or by them being oriented to face each other. In a preferred embodiment of the invention, proximity is detected if one or both toys include a magnetic field generator, such as a magnet, and the other toy includes a switch which is activated by a change in magnetic field. Additionally or alternatively, proximity is detected by a metal part of one toy affecting a resonance circuit in the other toy.

Signal 24 is not limited to acoustic signal. In a preferred embodiment of the invention, the signal (and/or the responses) may comprise control of acoustic signal amplitude and/or frequency, motion, rotation and/or modification of motion and/or rotation of the toy, its appendages or other parts thereof and/or control of illumination, such as blinking of lights.

In a preferred embodiment of the invention, a simple signal-response logic is sufficient, for example a mother cow toy moos and a toy calf doll moves towards the mother. However, in some preferred embodiments of the invention, a more complex logic is provided. Such logic may include one or more of, differentiation between different signals, multiple response, different operations modes and/or states, possibly switched between based on received signals, time duration and response times, detection of responses to a signal, detection of various characteristics of the environment, including number of participating toys and/or absolute and/or relative position and/or orientation and/or distance between the toys.

In a preferred embodiment of the invention, the response is time limited, for example a motion in response to a signal may be limited to 5 seconds and/or to a duration depending on the signal.

In a preferred embodiment of the invention, the logic is implemented by circuits in the toys. Additionally or alternatively, the toys each include a transmitter and/or a receiver and the logic is at least partially if not fully implemented on a computer which communicates with the toys. Alternatively or additionally, other computation requirements of the toys, for example speech signal generation and/or display generation may be performed at the computer and transmitted to a toy for display (visual or acoustic).

In a preferred embodiment of the invention, the detection of a signal by a toy comprises a binary detection of the signal, e.g., an on/off state. Additionally or alternatively, more complex signal detection may be implemented, for example, detection of signal amplitude, frequency, frequency spectrum, Doppler shift, change in amplitude and/or duration, detection of a number of repetitions, voice and/or other pattern recognition in the sound, detecting patters of motion, for example gestures and/or detection of codes, for example in a flashing light source. Thus, the transmitted signal may include information about the sending toy's activities, location, environment, nearby toys, locally sensed information, logic state and/or readiness.

Such signal detection and/or analysis may also be performed on a computer which is in communication with the toys. The physical detection circuit is preferably located on the toy. Additionally or alternatively, the detection circuit is also located on the computer.

Figure 2:
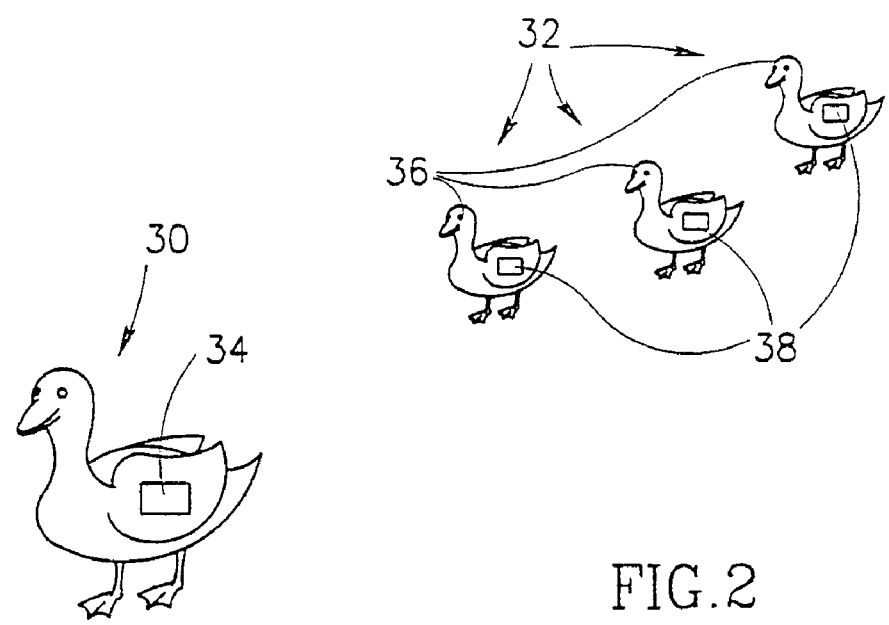
FIG. 2 is a schematic illustration of a mother goose and goslings toy kit, in accordance with a preferred embodiment of the invention.

FIG. 2 is a schematic illustration of a mother goose and goslings toy kit, which includes a goose 30 and a plurality of goslings 32, in accordance with a preferred embodiment of the invention. In a preferred embodiment of the invention, goose 30 includes a signal generator, for example a sound generator 34. The sound generator may be activated randomly, when activated by a player and/or as a result of goose 30 moving or being squeezed. In a preferred embodiment of the invention, generator 34 is integrated into the legs of the goose so that a "stomping" sound is generated when the goose makes a step. Additionally or alternatively, the sound may be a periodic and/or random "quacking" sound. In a preferred embodiment of the invention, each of goslings 32 includes a sound detector 36. Preferably, the sound detector detects the sound (or other signal) generated by the goose and causes gosling 32 to respond. One possible response is a "quack". Additionally or alternatively, the gosling moves towards the mother goose. Preferably, each gosling includes a sound generator 38, for other goslings to follow. Additionally or alternatively, all the goslings follow the mother goose.

In a preferred embodiment of the invention, sound detector 36 comprises a directional microphone, for example a stereophonic microphone or a microphone in which the frequency response is spatially non-uniform. In a preferred embodiment of the invention, a plurality of microphones are provided on each toy, so that holding the toy will be unlikely to cover all the microphones and deafen the toy. Additionally or alternatively, the microphones are located in hard-to-obstruct locations.

In an alternative preferred embodiment of the invention, the toys comprise puppy dolls, possibly with a mother puppy. In a preferred embodiment of the invention, when one puppy detects that a child is near, for example based on a crinkling bracelet worn by the child, the puppy signals to all the other puppies, for example by barking, and the other puppies approach the child, escape from it, start running in circles and/or otherwise respond to the child.

Figure 3:
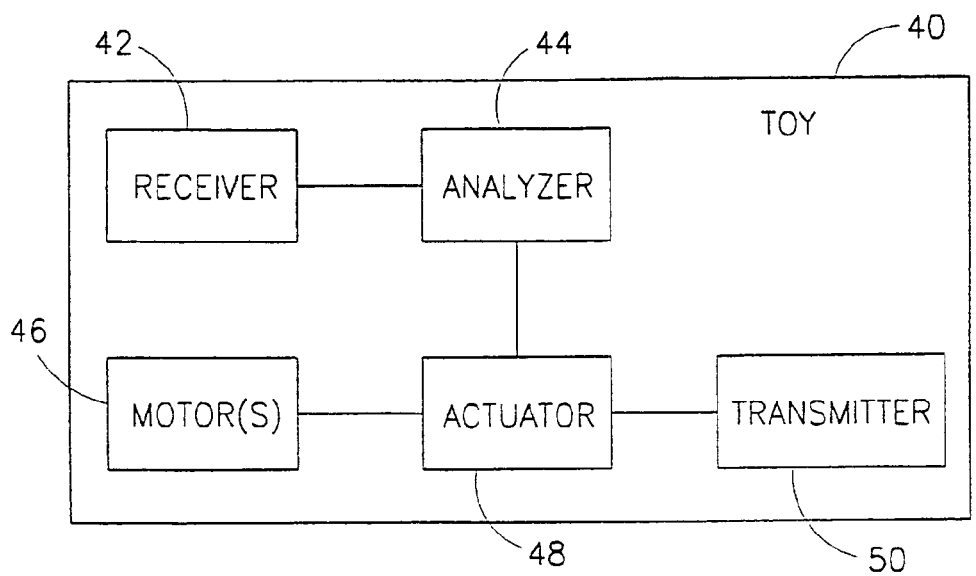
FIG. 3 is a schematic block diagram of an individual interactive toy figure, in accordance with a preferred embodiment of the invention.

FIG. 3 is a schematic block diagram of an individual interactive toy FIG. 40, in accordance with a preferred embodiment of the invention. Toy 40 preferably includes a receiver 42 which receives a signal from another toy. The signal is preferably analyzed by an analyzer 44. to decide on desired responses. An actuator 48 may be used to control one or more motors 46 and/or to send a signal via a transmitter 50. Additionally or alternatively, an acoustic and/or optical response may be generated. Additionally or alternatively, a message may be displayed on a screen which forms part of toy 40.

In a preferred embodiment of the invention, analyzer 44 and actuator 44 are embodied as a micro-controller. In a preferred embodiment of the invention, receiver 42 and transmitter 50 are embedded as piezoelectric acoustic elements, possibly as a single element. In a preferred embodiment of the invention, the output of receiver 42 is amplified to TTL levels and connected directly into one or more data lines of the micro-controller. for analysis. Thus, a high acoustic frequency can be detected and/or analyzed, without requiring an A/D. Preferably, the signal is amplified by various amounts, such as multiples of two of each other and connected in parallel to a plurality of data legs, so that multi-level signal detection is facilitated.

In a preferred embodiment of the invention, a toy kit includes a "dog" figure and a plurality of "sheep" figures. The dog figure moves in the direction of the sheep figures and causes the sheep figures to huddle up and/or move in a particular direction. In a preferred embodiment of the invention, the dog figure includes a memory so that it can track positions from which it "barked" at the sheep figures and/or to store the locations of a plurality of sheep. Preferably, the dog and/or the sheep include a position detection circuit, for example, by detecting a signal transmitted by a base station, for example incorporated in a barn. Additionally or alternatively, the dog includes a relative motion sensor, for calculating its current position, for example based on motion of wheels of the dog.

In a preferred embodiment of the invention, a plurality of "ant" figures are provided. In a preferred embodiment of the invention, the ants include a proximity detector, so that they can exhibit different behavior if they are near each other or if they are far away from each other, for example whether or not to follow other ants. In a preferred embodiment of the invention, the proximity detection is based on magnetic fields, for example DC magnetic fields or low frequency and/or pulsed magnetic fields. Such fields are generated by a rotating magnet, in accordance with some preferred embodiments of the invention.

In a preferred embodiment of the invention, individual toys may be programmed to specifically respond and/or interact with other specific toys. Additionally or alternatively, the toys may be programmed so that there is an order between the toys, at least an indication of a "leader" toy. In one example, each toy transmits and/or receives at a different frequency band. Additionally or alternatively, each toy transmits and/or receives at a different time delay after detecting a sound. Thus for example in the mother goose embodiment, each gosling may quack back at a different delay after the mother goose quacks. Each gosling may also be programmed to follow a gosling which quacks at a particular delay after the mother goose (e.g., no delay if it is the lead gosling).

Figure 4A:
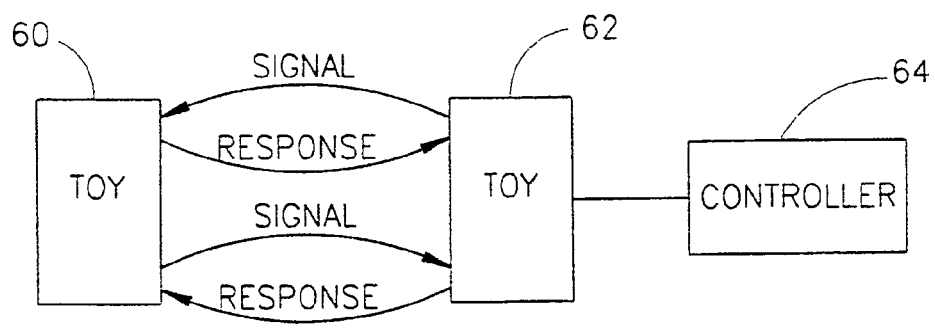
FIG. 4A is a schematic block diagram illustrating two interactive toys, wherein one of the toys is at least partially controlled from a remote location.

FIG. 4A is a schematic block diagram illustrating two interactive toys, a toy 60 and a toy 62, where one or more toys 62 are at least partially controlled from a remote controller 64. In a preferred embodiment of the invention, controller 64 directly controls a signal generated by toy 62 and/or its response to a signal generated by toy 60. Additionally or alternatively, the control may be more subtle, for example, changing a mode of operation of toy 62. Additionally or alternatively, control may be exerted by controller 64 directly generating a signal to toy 60 and/or directly generating a response to a signal from toy 60.

Several dimensions of control are preferably differentiated by all or part of the following analysis:

(a) Is the controller a human, a computer, or a predetermined sequence, such as a tape recording?

(b) Is the control over all aspects/controllable features of the toy or only over some aspects, possibly a single one?

(c) How do the type, extent, amount and/or other characteristics of the control vary over time and/or as a function of interaction between the toys, where such characteristics may vary or remain constant?

(d) Is the control form a nearby location, a line of sight location, a next room or possibly a different city or country?

In a preferred embodiment of the invention, toy 62 includes a remote control, for example a radio remote control. Additionally or alternatively, toy 62 responds to commands from a computer and/or transmissions responsive to a broadcast or a recorded tape. Additionally or alternatively, toy 62 is activated by a player's voice and/or movements.

In a preferred embodiment of the invention, the signals transmitted from toy 62 to toy 60 comprises a command from controller 64.

In a preferred embodiment of the invention, a human player controls toy 62 using a signal generator attached to the player. Such a generator may comprise a bracelet which crinkles. Additionally or alternatively, the generator may comprise a magnetic bracelet. In a preferred embodiment of the invention, toy 62 can detect the relative position and/or orientation of the bracelet and/or motions thereof. In a preferred embodiment of the invention, such detected locations and/or orientations may be used to control an interactive computer game, such as boxing, baseball or golf, whereby hand motions of a computer character are controlled by the motion of the bracelet, a glove and/or a sound maker (passive and/or battery operated) mounted on a play implement such as a bat, a club, a steering wheel, a joystick, a sword or a gun. Alternatively or additionally, the motion of the play implement are used to model the motion of a virtual play implement in the game, such as a bat. The motion which is responded to may include, position, motion vector and/or acceleration, in one, two or three dimensions. Five- (or higher) degrees of freedom sensing may require more than one transmitter or receiver on the play implement.

In a preferred embodiment of the invention, the acoustic transducer on the bat (or other play implement) comprises a bendable piezoelectric film, which is bent around the bat, so that the transmission and/or reception is less limited by the orientation of the bat.

In a preferred embodiment of the invention, an action figure responds to these motions in parallel to the computer game, either by directly receiving the motions or by receiving suitable commands from the computer. One or more additional action figures may be controlled by the computer to exhibit the actions of other characters in the computer game.

In a preferred embodiment of the invention, toy 62 is controlled from a remote location. Preferably, signals to toy 62 are forwarded to the remote location. In one example, a child pretends that toy 60 is talking to toy 62. The sound made by toy 60 or by the child is transmitted to the remote location or is naturally audible at the remote location. The voice of toy 62 and/or actions thereof may be provided by a parent in another room or even in another city. In a preferred embodiment of the invention, toy 62 is semi-automatic, so the parent can decide who responds to toy 60, the parent or toy 62. Preferably, toy 62 delays its response until it is clear the parent will not respond. Additionally or alternatively, the toy is controlled via a switch on the remote control. Additionally or alternatively or a parent, the toy may be controlled and/or may represent a friend of the child, in a remote location, such as the friend's house. Preferably, the friend also has a toy which exhibits the behavior of toy 60. Additionally or alternatively, the friend can view a simulated behavior of toy 60 on a computer screen. Thus, the two children can play together without leaving home.

Figure 4B:
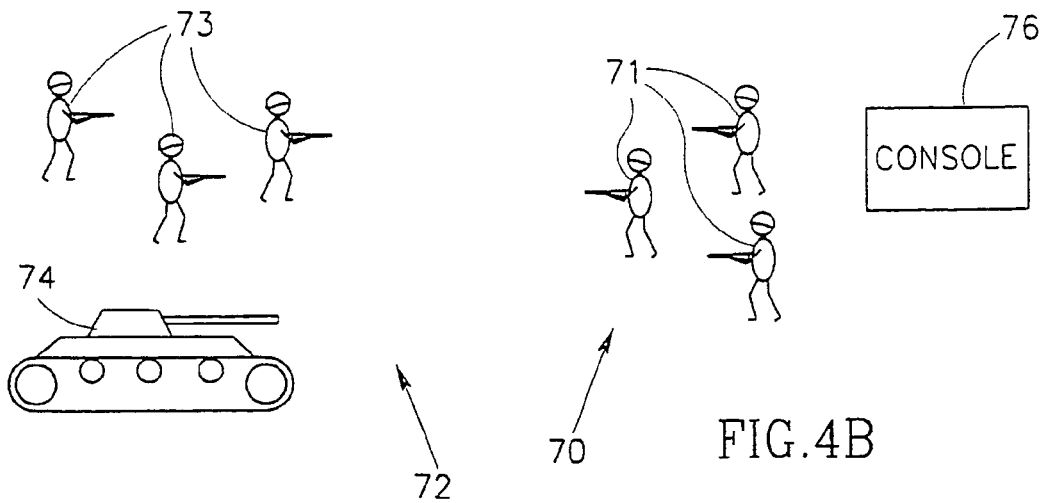
FIG. 4B is a schematic illustration of a soldier toy kit comprising two units of soldiers, a tank and an optional command console, in accordance with a preferred embodiment of the invention.

FIG. 4B is a schematic illustration of a soldier toy kit comprising two units of soldiers 70 and 72, each comprising a plurality of soldiers 71 and 73, an optional tank 74 and an optional command console 76, in accordance with a preferred embodiment of the invention.

In a preferred embodiment of the invention, the soldier toy kit allows an easy play with a large number of individual toys, for example as shown in FIG. 4B. In a preferred embodiment of the invention, each of the individual toys responds to actions and/or movements of the other toys, for example, a toy soldier 73 may repeat any command voiced by any of the other toy soldiers. Additionally or alternatively, the soldiers in a single unit may advance in a synchronized manner, for example all moving together or in a staggered manner. In a preferred embodiment of the invention, the soldiers are wheeled. Additionally or alternatively, the soldiers move using legs.

In a preferred embodiment of the invention, toys from one unit also respond to actions/signals from toys in the other unit. In one example, when tank 74 fires at a soldier 71, the soldier responds by falling and shouting out. Preferably, the soldier detects it is in range by the signal source (such as sound) on tank 74 being directional and soldier 71 being in the direction. In another example, when a soldier 73 moves a soldier 71 advances in response. A directional sound wave may be generated using a suitable wave guide. Additionally or alternatively, two sound sources may be activated in phase, so that they are received in phase substantially only along one line emanating form the sound sources. Alternatively or additionally, a relative orientation of a sound source may be determined using two microphones on the toy. Additionally or alternatively, the sound may be conducted via a floor, with the microphones being acoustically coupled to the floor.

In a preferred embodiment of the invention, console 76 may be used to command individual toy soldiers or groups of toys. Additionally or alternatively, only some of the toys are commanded and those toys generate and transmit commands for the other toys. Additionally or alternatively to using a console, the control may be by voice commands of a player. Additionally or alternatively, the console may be used to provide remote commands, for example from a player in a different house. In a preferred embodiment of the invention, the console 76 includes a computer, for displaying the relative positions of the toys, their logic, their mode and/or their responses to a remote player or a local player. Additionally or alternatively, console 76 includes a camera for viewing the toys and transmitting their image to the remote location. Additionally or alternatively, console 76 includes a loudspeaker for sounding vocal commands from the remote location.

In a preferred embodiment of the invention, the toys (e.g., their action logic and/or their specificity) may be programmed by computer. Preferably, the programming is downloaded to the toys. Additionally or alternatively, the toys communicate with a computer to perform their logic, so at least for some cases/game scenarios only the computer is (re)programmed. In a preferred embodiment of the invention, at the start of the play the computer interrogates all the toys, to determine which toys are actually in a playing field.

In a preferred embodiment of the invention, spatial angles between a sound source and a plurality of microphones are determined by analyzing phase differences at the microphones. Alternatively or additionally, other methods known in the art may be used. In a preferred embodiment of the invention, a relative location of a pulsing sound source and a plurality of microphones is determined by solving time of flight equations.

In a preferred embodiment of the invention, four microphones are used to determine a three-dimensional position. For a source at $r=(x_0,y_0,z_0)$ and a plurality "i" of microphones at $M_i=(x_i,y_i,z_i)$, the distances between the source and the microphones are $D_i=\|r-M_i\|$. The acoustic velocity, "c", may be known, for example based on a known velocity in air. Alternatively, it may be determined by measuring the time of flight between a sound source and a microphone having fixed and known relative locations. A difference between distances is preferably defined as $dD(i,j)=Di-Dj=c*dt(i,j)$, where $dt(i,j)$ is defined as a difference between time of arrival at microphone i and time of arrival at microphone j. For N microphones there are N−1 independent differences dD. In an optimal configuration, the four microphones located at vertexes of a tetrahedron may be used to determine the location of a source. From practical considerations, such an arrangement may not be possible. Preferably, more than four microphones are used, so that a higher resistance to noise and/or a higher localization precision may be achieved. In a preferred embodiment of the invention, the three dimensional position is determined by numerically or analytically solving three equations of the form:

$$dD=c*dt(i,j)=\|r-M_i\|-\|r-M_j\|,$$

where (i,j) is preferably selected to be (1,2), (2,3) and (3,4). However any other independent three pairs of microphones may be used.

In one preferred embodiment of the invention, a computer loudspeaker, for example as provided with a popular sound card, such as "SoundBlaster" is used to transmit sonic and/or ultrasonic signals to a toy and/or other object. Preferably, a 20 kHz signal is used. In a preferred embodiment of the invention, the object receives the ultrasound signal and sends it back to a microphone of the computer. In a preferred embodiment of the invention, the computer analyses the time of flight and/or other attributes of the transmission and determines a distance from, position to, velocity of motion and/or other spatial attributes of the object.

In a preferred embodiment of the invention, the object responds immediately to the interrogation signal. Alternatively, the object delays its response to an interrogation signal, for example for a few milliseconds. Alternatively or additionally, the object transmits at a different frequency, for example 40 kHz. Alternatively or additionally, the signal transmitted by the object is received by a transducer which then transmits the signal to the computer, for example acoustically or using electromagnetic coupling. Alternatively or additionally, the object may respond with an identification code. Alternatively or additionally, the object modulates its transmission with an envelope, which envelope preferable server as an identification code and/or for transmission of information regarding a status of the object, for example a position of an arm of a toy. In some cases, the object relays information from a more remote object. In the case of identification, the object may send an ID code even without prompting from the computer, for example periodically or by a user pressing a button on the object. In some cases, the transmitted information is digitally encoded, for example using FSK encoding. Alternatively, other encoding methods, such as analog encoding method may be practiced. Alternatively, the signals may be un-encoded, for example, the amplitude of the signal or its frequency directly representing the information. Various details of transmission and reception methods are described in U.S. Provisional patent application No. 60/122,687, filed Mar. 3, 1999 and titled "Computer Communication", the disclosure of which is incorporated herein by reference.

In a preferred embodiment of the invention, the signal received on the computer is used to modify a computer game and/or to generate commands to other toys, preferably using sounds generated by the computer.

In a preferred embodiment of the invention, the object amplifies the signal it receives using a discharge of a coil through a transistor, where the transistor serves as a variable resistor and/or as a wave-form controller.

In a preferred embodiment of the invention, a toy may include a plurality of transmitters and/or receivers (sensors) thereon, controlled by only one circuit. In one example a bendable or deformable toy, such as a boxing glove or a toy train include one sensor on each segment of the toy. Preferably, a multiplexer multiplexes the inputs and/or outputs of these sensors, to reduce the number of channels required of the circuit. The multiplexing may be a time multiplexing. Alternatively or additionally, the multiplexing is a frequency multiplexing, possibly extending to frequency multiplexing in the signals transmitted by a computer with which the toy communicates. Alternatively or additionally, the multiplexing allows a single acoustic element to be selectively used as a transmitter or as a receiver.

In some cases, the microphone and/or the sound card are sensitive enough to receive from the object RF signal associated with generating the acoustic signals, even if an acoustic signal is not sent. Alternatively or additionally, a toy or other device may receive RF transmitted by a computer's or other device's loudspeaker. Preferably, frequencies of about 20 kHz, 22 kHz and 24 kHz are used, since a standard sound card has these sampling rates.

Alternatively or additionally, to using a computer, in a preferred embodiment of the invention, a set-top box is used to transmit and/or receive signals. Preferably, a microphone is connected to the set-top box. Alternatively or additionally, the transmission back to the set-top box uses an IR signal, which is detectable by the set-top box. In one example, the set-top box includes software which analyses signals. Such signals may comprise responses of objects and/or toys to sounds generated by the television or by the set-top box. Alternatively or additionally, the set-top box adds sounds to a video and/or audio stream decompressed by the sound box. Alternatively or additionally, the set-top box adds temporal and/or spatial optical modulations to a video stream, for an optically-sensitive toy to detect and/or respond to, for example by moving or generating a sonic or ultrasonic sound.

The set-top box may be used to receive signals and/or to analyze signals for sending to a cable head. Alternatively or additionally, the set-top box includes software for a considerable portion of a game, for example score keeping and/or display update, possibly utilizing a cable head as a storage device and/or as a display-generating slave.

A touch screen in accordance with a preferred embodiment of the invention utilizes acoustic transmission to detect the location of a touch implement, such as a pen or a toy control, such as a bat. In a preferred embodiment of the invention, the position of the pen is determined using one or more microphones and/or speakers mounted on the pen, which transmit and/or receive signals from a computer and/or other speaker and/or microphone controller. Possibly, a three-dimensional position of the touch implement is determined using four acoustic elements, such as two microphones and two speakers. It is noted that a computer typically includes a modem speaker, an internal speaker and/or a keyboard speaker, as well as sound-card speakers.

In a preferred embodiment of the invention, location methods utilize a calibration process, in which the located implement is placed at one or more known location, so that it is possible to correct for the location of the speaker(s) and the microphone(s). Alternatively or additionally, the calibration procedure is used to correct for propagation times (of the acoustic waves and/or of electronic signals which generate sounds) and/or for reflections, wavelength dependent attenuation and/or broadband attenuation.

A different type of touch screen in accordance with a preferred embodiment of the invention detects the location of a touch implement based on the detection and position determination (2D or 3D) of sounds generated when the touch implement touches the "touch sensitive" surface.

Another type of touch screen or object position detector in accordance with a preferred embodiment of the invention, detects the touch implement based on its occluding beams of ultrasound which crisscross the touch screen. This may require more than one speaker and/or microphone.

Figure 5:
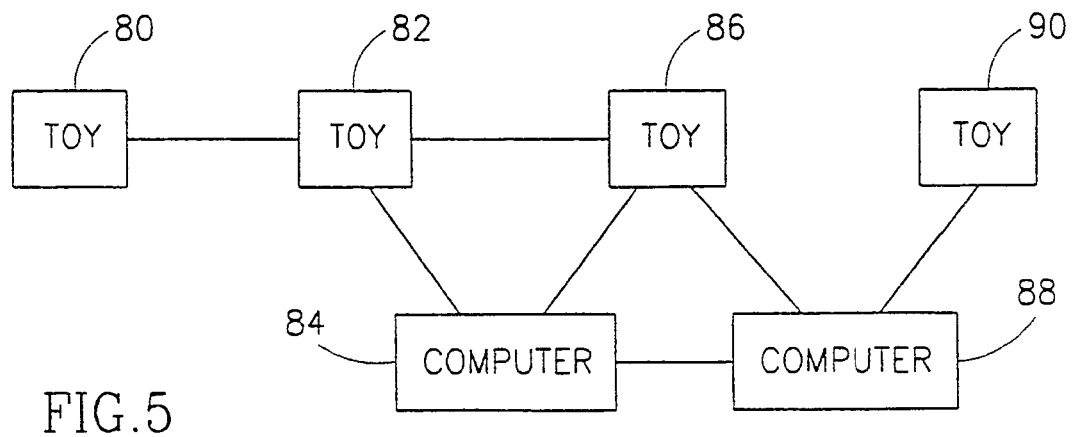
FIG. 5 is a schematic block diagram of a network configuration for toy interconnection, in accordance with a preferred embodiment of the invention.

FIG. 5 is a schematic block diagram of a network configuration for toy interconnection, in which each connecting line indicates a possible communication path, in accordance with a preferred embodiment of the invention. In a preferred embodiment of the invention, a toy 80 and a toy 82 can directly communicate. Additionally or alternatively, toy 82 and a toy 86 can communicate using an intermediary, for example a computer 84, to which both can communicate. Additionally or alternatively, toy 80 communicate with toy 86 using toy 82 as an intermediary. Preferably, signals from toy 80 include a designation of toy 86. Additionally or alternatively, all messages are multi-cast.

Additionally or alternatively, toy 82 communicates with a toy 90 by computer networking, such as a LAN or an Internet, by which toy 82 communicates with computer 84, which communicates with a computer 88, which communicates with toy 90. Additionally or alternatively, a single toy 86 may communicate with two computers, 84 and 88, possible transmitting messages from one to the other, being controlled by one or both and/or providing status reports to one or both.

In a preferred embodiment of the invention, the toys communicate via acoustic waves, audible or inaudible. Additionally or alternatively, the toys communicate using IR. Additionally or alternatively, the toys communicate using RF signals. Additionally or alternatively, the toys communicate using low frequency magnetic fields. Additionally or alternatively, the toys communicate by telephone, for example, one of the toys being connected to a telephone socket, a cellular phone and/or being in communication with a computer which is connected to such a telephone connection. Such a telephone connection may also be used for a modem dial-up connection and/or for an Internet connection. In a preferred embodiment of the invention, the toy is controllable by DTMF sounds generated by a telephone keyboard, to simplify communication hardware.

In a preferred embodiment of the invention, the signals generated by a toy are inadvertently generated, for example, sounds generated by a wheel rotating or an appendage flapping. Additionally or alternatively, the signals are included in a generated action, for example, a quack sounded by a toy, which may be modulated by a signal, a blinking light, whose blinking may be modified by the signal or a waving gesture which may be modified and/or its duration or amplitude changed, to convey a signal. Additionally or alternatively, the signals are determined by analyzing a response, for example differentiating between different sounds produced by a first toy to decide which sound to make in response. Additionally or alternatively, the signal may be additional to generated actions, for example, an extra beep after a "quack". Preferably, such additional signals are made as unobtrusive as possible, for example by being ultrasonic.

Figure 6:
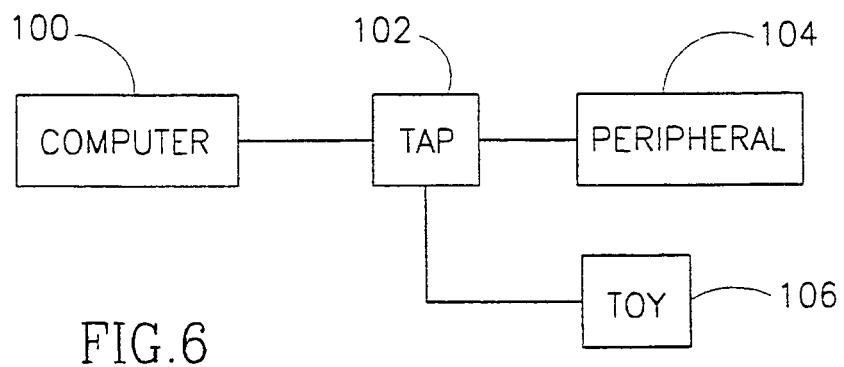
FIG. 6 is a schematic block diagram of a communications tap for a computer, in accordance with a preferred embodiment of the invention.

FIG. 6 is a schematic block diagram of a communications tap 102 for a computer 100, in accordance with a preferred embodiment of the invention. One problem with computer communication is setting up the hardware and software for communications. In the configuration of FIG. 6, a tap is preferably placed on communication line to an existing peripheral 104. Thus, a user may not be required to even access a back part of a computer, let alone a computers inside. A toy 106 preferably sends and/or receives signals from tap 102. Additionally or alternatively, toy 106 may use one tap for receiving and one for sending.

In a preferred embodiment of the invention, the tap is placed on a cable to a printer, a network cable, a camera cable and/or a SCSI connection. Additionally or alternatively, the tap is placed on a serial cable, for example a mouse cable. Additionally or alternatively, the tap is placed on a modem line, for example on a telephone line or by plugging the tap into another telephone socket, to be received by the modem. Additionally or alternatively, the tap is placed on a game controller line. Additionally or alternatively, the tap is placed on a loudspeaker line. Additionally or alternatively, the tap is placed on a microphone line. Additionally or alternatively, the tap is placed on a display cable line.

In a preferred embodiment of the invention, the tap includes an electro-magnetic coupler, which can induce signals in a cable which passes through or near the tap. Additionally or alternatively, the tap can detect signals in the line and transmit them to toy 106. In a preferred embodiment of the invention, the signals are at a different carrier frequency and/or signal frequency than the usual signals passed along the line. Additionally or alternatively, the signals travel in an opposite direction (input signals on an output line, such as a printer or output signals on an input line, such as a mouse). Additionally or alternatively, the signals encode data which is detected and removed from the data stream in the computer. Additionally or alternatively, the signals are asynchronic on a synchronic line. Additionally or alternatively, the signals are transmitted only when no signal is expected by the computer and/or the peripheral.

In an alternative embodiment of the invention, a piezoelectric actuator (or other vibrating element) is connected to a mouse. The actuator causes the mouse to shake at an amplitude of one or two screen pixels (or less) and the shaking is detected by software in the computer as signals from the toy. A return signal may be transmitted to a tap associated with the actuator, along the serial cable, with the signal preferably being coded to be recognized by the tap and/or ignored by the mouse.

In an alternative embodiment of the invention, toy 106 communicates with computer 100 using a speaker and a microphone of the computer. Preferably, toy 106 receives transmissions from the computer loudspeaker and/or sends signals to the computer microphone. Additionally or alternatively, signals are transmitted to toy 106 via the microphone and received via the loudspeaker, depending on whether the hardware supports such a reverse connection.

In an alternative embodiment of the invention, toy 106 sends signals to computer 102 using a tap which presses keys on a keyboard attached to computer 100. Preferably the key sued is a shift key. Additionally or alternatively, signals from the computer are detected by detecting illumination of LEDs on the keyboard, for example a "Num Lock" LED.

Additionally or alternatively, toy 106 utilizes a transducer which plugs into a parallel port, a serial port and/or is optically coupled or placed near an IR port. Preferably, the transducer is a pass through transducer, through which a printer and/or other peripherals may communicate normally with a computer.

In a preferred embodiment of the invention, the tap and/or transducer can automatically detect which type of cable is tapped/port is connected to. Preferably, such detection is by analyzing amplitude, frequency and/or synchronization of signals passing through the lines. Additionally or alternatively, the computer detects which line is tapped, by detecting particular inferences on that line. Alternatively or additionally, software on the computer sends test signals along the lines, to be detected by the tap.

In a preferred embodiment of the invention, suitable software is installed on computer 100. Preferably, the software is self installing. Preferably, the computer is not used for any other use while toy 106 is communicating with it. Additionally or alternatively, the software can differentiate between "regular" signals" and signals related to the tap. In one example, a provided keyboard driver may detected special codes and/or data sequences on the keyboard line and remove them from the received data, passing only the rest of the received data to an operating system of computer 100. Additionally or alternatively, a provided mouse driver may detect spurious and/or small mouse movements, and recognize them as being tap related signals. Additionally or alternatively, a printer driver can recognize data on the cable as not coming from the printer but from a tap. Additionally or alternatively, data sent to the tap is preferably sent as data which will be rejected or ignored by the peripheral. Alternatively or additionally, to using a tap for communication with a toy, such a tap may be used to attach a peripheral to computer 100.

In a preferred embodiment of the invention, such an acoustic or other communication may be used to program a toy and/or retrieve information from a toy, for example replacing an RF link as described in U.S. Pat. No. 5,752,880, referenced above. Alternatively or additionally, such a link may be used for real-time communication with the toy.

In another example, an acoustic transmitting card is used to operate arcade games. Such a card may utilize the speaker and/or microphone of the game. Alternatively or additionally, the card may include information about the user, for example for billing. Alternatively or additionally, the information may include gaming information, for example how far in the game the player is or player level, so the arcade game can be suitably configured.

Such acoustic communication may also be used to communicate between a play implement and a computer game, for example between a sword and a play station. In one example, a light-pen or a light-gun transmits to the playstation a signal responsive to pixel intensities which are detected by a photo-detector thereon. Alternatively or additionally, a synchronization signal is transmitted from a computer and/or a set-top box to the pen, to synchronize the pixel detection with the TV raster scan. These transmissions may be additional to—or alternative to—transmission of position and/or orientation. Alternatively or additionally, the play implement transmits the status of controls thereon. Alternatively or additionally, the transmission is used to transmit information to be displayed on the implement, for example to light up lights thereon, display a number of kills thereon and/or drive text and/or graphics displays thereon.

Figure 7:
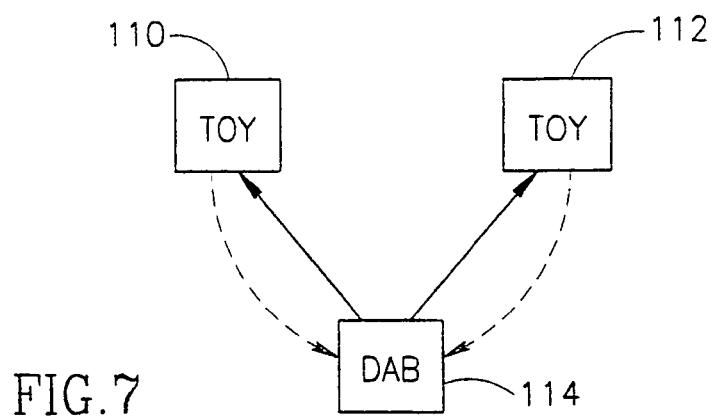
FIG. 7 is a schematic block diagram of a toy network utilizing a central broadcasting station, in accordance with a preferred embodiment of the invention.

FIG. 7 is a schematic block diagram of a toy network utilizing a central broadcasting station 114, in accordance with a preferred embodiment of the invention. In a preferred embodiment of the invention, a toy 110 may be controlled by central broadcasting station 114. In a preferred embodiment of the invention, station 114 is a DAB (Digital Audio Broadcast). Additionally or alternatively, station 114 is a cable broadcast or and Internet broadcast. In a preferred embodiment of the invention, toy 110 comprises a quiz toy which receives the quiz questions from station 114 and interacts with a player. In a preferred embodiment of the invention, a second toy 112, possibly at a remote location is also controlled by the same or related broadcasting station. Thus, toys 110 and 112 may be operated in a synchronous manner, for example, both asking the same quiz questions or questions selected from a same question set, at the same time. In a preferred embodiment of the invention, the toys include a communication feedback to station 114, the feedback indicated by dotted lines in the figure. In a preferred embodiment of the invention, station 114 receives from the toys an indication of progress of the quiz, a number of correctly answered questions, an identification of the toy or its owner and/or other information related to the particular quiz, a history of playing and/or the player. In a preferred embodiment of the invention, station 114 broadcasts to the toys an indication of a winner of the quiz and/or other statistical information relating to the plurality of players simultaneously playing the quiz. In one example, the name of the winner is broadcast. In another example, a signal is broadcast so that only the winner toy will say "I am the winner".

In a preferred embodiment of the invention, each toy comprises a receiver for receiving the DAB broadcast and decoding information stored thereon. Preferably, the feedback is provided by a telephone connection from the toy. Preferably the feedback connection is used only if the toy is the winner or in the case of other infrequent occasions, so as not to tie up telephone lines. Additionally or alternatively, the feedback is meditated by a computer with which the toy communicates.

Additionally or alternatively, in cable broadcasting embodiments, the feedback connection may be via cable modem. Additionally or alternatively, in Internet broadcasting methods, the feedback may be by e-mail or by TCP/IP.

Various examples of preferred embodiments of the invention will now be described.

In a preferred embodiment of the invention, a following toy is provided, in which the following toy preferably follows sounds made by a human while the human is walking, for example footstep sounds. Alternatively, the toy follows sounds from a device on the human. Alternatively, the toy moves away from the human. In a preferred embodiment of the invention, the sounds are programmed into the toy. In a preferred embodiment of the invention, when a stomping or other programmed sound is detected by the toy, the toy cringes, as if stepped on and/or displays other changes in its activity. In one example, the toy has a shape of a spider, with the legs being supported inside the body of the spider using a string. When the spider cringes, the string is released and the legs collapse. Alternatively or additionally, to responding to foot steps, a toy may be programmed to follow and/or respond to clicking at a keyboard, a telephone ringing and/or other sounds. In a preferred embodiment of the invention, the toy is programmed by a user, for example by subjecting the toy to a sample sound. Thus, such a spider can be programmed to recognize foot steps of a particular individual.

In a preferred embodiment of the invention, a hugging follower toy is provided, for example in the form of a panda. When the panda catches up with the object it is following, for example a child, but also possibly another toy, the panda preferably hugs the object. Preferably, the distance to the followed objected is determined as described herein. Alternatively, a contact determination is made. Alternatively, the determination utilizes a static-electricity charge on the followed object.

Alternatively or additionally, a following toy may respond differently to different sounds, thus appealing to participate in a multi-player game. In one example, a dog may follow players around and jump up at a ball, when the ball hits a floor or is caught.

In a preferred embodiment of the invention, fighting action figures are provided, in which an action figure, for example a "ninja turtle", responds to actions of a player, for example waving a hand when the player waves a hand. Preferably, the figure responds to sounds generated by sound-makers on various portions of the player's body. Alternatively or additionally, weapon toys respond to sounds made by the player, for example, a bow may release an arrow, responsive to a certain sound.

In a preferred embodiment of the invention, a flipping toy is provided. Preferably, the flipping toy includes two or more sides. When the toy is "startled" with a particular sound, the toy files, to display a different side. In one example, one side is a happy animal and the other a snarling animal. In another example, one side is a camouflaged soldier and the other a non-camouflaged solider. Optionally, each side transition requires a different startle sound, for example one for the solider to become camouflaged and one for the solider to show himself. In a preferred embodiment of the invention, the toy flips by suddenly shifting an internal weight, for example using an electric motor or a solenoid. Alternatively or additionally, to flipping, the toy may change position between a small number of fixed positions, for example, standing and sitting.

In a preferred embodiment of the invention, a moody animal, for example a dog is provided. When the dog is "hungry" it snarls and/or displays other attributes of a certain behavior. When toy food is thrown to the dog (identified for example by a sound generated by the food), the dog changes its mood and/or goes to the food and/or a different location in the room, for example a food box. In one embodiment, the food comprises a marble.

In a preferred embodiment of the invention, a toy animal is controlled using sounds generated by a telephone. In one example, the telephone is used to call into a computer and the computer detects sounds from the telephone, for example DTMF sounds. In another example, a computer and/or a toy can respond to DTMF tones generated by a telephone handset, a wireless telephone, a cellular telephone or even a play telephone.

In a preferred embodiment of the invention, a baby mobile responds to sounds made by a child, for example changing its speed, direction of motion, distance of moving elements from a baby and/or other attributes of the mobile. In one example, a mobile comes closer to the baby when the baby is quiet and retreats when the baby makes a load noise.

In a preferred embodiment of the invention, a multi-part toy is provided, in which the parts attempt to follow each other. In one example, the multiple parts comprise portions of a caterpillar, with each part trying to catch the other parts. Preferably, the parts follow each other in order. In this embodiment, it may be an advantage if the parts cannot follow exactly. Preferably, if a caterpillar part catches up with another part, the parts connect together at their point of contact, possibly disconnecting a short while later. Possibly, the caterpillar starts moving only upon hearing a certain sound. Possibly, the tracked sounds is generated by a movement rustle and/or by a sound generated inadvertently by a motor which generates the motion. In another example, a shell of a turtle attempts to catch and/or enclose a turtle (without a shell). In another example animal catchers, possibly with nets, attempt to close in on an escaping animal. In another example, a plurality of soccer player figurines (or action figures) attempt to catch a ball. Possibly, some or all of the figurines may be controlled by sounds made by a human player. Alternatively or additionally, the figurines respond to sounds made by the ball and/or other soccer players.

In a preferred embodiment of the invention, a plurality of figurines are provided, each of which responds to a different musical note. Thus, when music is played (recorded or live) the figurines "dance" to the music. As described herein, a complex logic may be defined for sound responsive toys, for example, the toy may respond differently if it is still in motion when it hears a same note a second time.

In a preferred embodiment of the invention, computer games are provided in which a computer display responds to external sounds.

In a preferred embodiment of the invention, a bowling game is provided, in which a computer detects sounds generated by a moving bowling ball and knocks over pins on a display. Preferably, a soft ball is used, preferably, the motion of the ball is determined relative to the computer microphone and/or speakers, as described herein. Alternatively, an independent sound generator and/or receiver may be utilized, which sound element is preferably integrated with a computer using minimally-installed hardware, as described herein.

In another example, a computer displays a thrown ball, for example a baseball and determines a "hit" based on detected motion of a baseball bat. In another example, a computer goalie attempts to stop a real ball kicked by a player. The position and/or other motion attributes of the ball are preferably determined by acoustic distance determination using only the hardware already installed in a standard computer, for example as described herein. In another example, a boxing match a computer tracks motion of a glove, to detect hits on a computer figure and/or to emulate evasive maneuvers. Alternatively or additionally, the computer tracks motion of the player, to aim its own punches and/or to assess a score. Optionally, the computer is used to display motion of a second remote player. Alternatively or additionally to boxing, the computer may track motion of sources (preferably with implanted sound devices or with a wrist band sound device). Alternatively or additionally, the computer may track positions and/or alignments of toy guns and/or of players holding the guns. Possibly a map of a room may be provided so the computer can determine if a gun has a line of site in the particular room.

In a preferred embodiment of the invention, a horse race is provided, in which progress in the race is generated responsive to movements of a player, sounds generated by spurs and/or sounds generated by a toy horse whip.

In a preferred embodiment of the invention, a set of playing blocks is provided, when a user moves a block, the computer detects the motion and preferably identifies the block. The computer preferably responds to the motion by stacking and/or un-stacking corresponding virtual blocks on a screen. In a preferred embodiment of the invention, only a small number of real blocks are provided. Possibly each time a block is mock stacked, a new virtual block is created and stacked. Possibly, a user may include voice commands, for example "drop". Alternatively or additionally, to blocks, other structural elements may be controlled.

In a preferred embodiment of the invention, a "Simon says" game is provided. In one example, a computer generates vocal instructions to a player and then tracks the players position and/or motion, to determine if the instructions are complied with and/or to score. Possibly, a single computer can track a plurality of players simultaneously. Alternatively or additionally, the computer may include a figure, for example a "Barney" figure, which responds to motion of players, for example as in a "following the leader game". In a preferred embodiment of the invention, a virtual action figure in a computer game may respond to sounds generated by a user, for example by growing. Possibly, if the figure grows too much, it pops and shrinks or "dies".

In a preferred embodiment of the invention, a computer pet is provided. The pet may be a virtual pet (e.g., software) or a real pet (e.g., hardware). In a preferred embodiment of the invention, the pet responds to sounds generated by the computer, for example advancing, retreating and/or licking the computer. In a preferred embodiment of the invention, the pet can be trained by a user, to respond to certain sounds. Alternatively or additionally, the computer "talks" to the pet, especially when the pet is in the vicinity of the computer and/or responsive to whether the computer is in use (e.g., being typed on) or not.

In a preferred embodiment of the invention, a computer generated figure responds to actions of a user. In one example, a stretch figure distorts itself in response to motion and/or sounds made by a user. In one example, moving an arm causes the figure to stretch its arm to a greater length.

In another example, when a user makes an animal sound, an animal figure appears. Alternatively or additionally, a user can emulate an animal, by the computer generating scenery appropriate for the animal (e.g., seascape, land, mountains) and then changing the scenery responsive to motions of the person (e.g., swimming, walking, wing flapping). Alternatively or additionally, the animal which appears interacts with the player, for example responding to sounds or movements.

In a preferred embodiment of the invention, the number and/or quality of sound generating devices and/or sound receiving devices is improved so that a virtual reality suit is provided. An example of improved quality is providing narrow bandwidth sound generators and/or transponders. Typically, a high quality is not required for games to be realistic and may not be economically feasible, however, a high quality may be desired. Such a suit generally enables a computer to track the motion of part or all of a body to a high accuracy and to generate imagery which incorporates the existence of the suit wearer. Typically, the imagery is displayed to the suit wearer. Such a suit preferably also includes feedback elements, for example piezoelectric vibrators, which provide feedback to a suit's wearer from objects in the virtual world.

In another exemplary embodiment, multi-player and/or board games are facilitated using methods and devices described above. In the example of a multi-player game, each player can have a remote unit having a button thereon, the remote units can communicate among themselves or with a central unit or a computer to determine which remote unit had its button depressed first. Alternatively or additionally, these remote units can be used to display information on the unit, for example a question to be asked by the unit holder or multiple-choice answers, one of which is to be selected by the unit holder. Alternatively or additionally, the central unit or computer can display information responsive to signaling by the units. As can be appreciated, using computer-networking techniques, some of these units may be quite remote geographically from the other ones. Alternatively or additionally, the remote unit may be used to indicate to a user that his turn has come up.

In a board game example, playing pieces may be lit-up or otherwise activated from a second unit, for example to indicate a suitable move or to remind a player of his term. Alternatively or additionally, the relative position of the pieces and/or the board may be used by a computer, for example to determine moves and/or administrate a game.

The present invention has been described in terms of preferred, non-limiting embodiments thereof. It should be understood that features described with respect to one embodiment may be used with other embodiments and that not all embodiments of the invention have all of the features shown in a particular figure or described with reference to a particular example. In addition, some embodiments may be implemented using various software and hardware combinations. The scope of the invention is to be construed to encompass both software and hardware suitable for caring out various methods and devices described herein. In particular, the scope of the invention is not defined by the preferred embodiments but by the following claims. Section titles, where they appear are not to be construed in limiting subject matter described therein, rather section titles are meant only as an aid in browsing this specification. When used in the following claims, the terms "comprises", "comprising", "includes", "including" or the like means "including but not limited to".

The invention claimed is:

1. A toy kit comprising:
   a first toy having a first function, which includes an acoustic sound transmitter which generates acoustic signals for play; and
   at least one second toy, which includes:
      a microphone adapted to receive the acoustic signals for play;
      an analyzer adapted to analyze the received acoustic signal and decide a response to the received signals for play based upon an outcome of the analysis; and
      an actuator adapted to control the at least one second toy to perform a second function responsive to the decision of the analyzer,
      whereby the acoustic signals for play generated by the first toy are suitable both for playing purposes and for analysis by the analyzer of the second toy.

2. A kit according to claim 1, wherein said toys are child-safe.

3. A kit according to claim 1, wherein said toys are toddler-safe.

4. A kit according to claim 1, wherein said toys are baby-safe.

5. A kit according to claim 1, wherein said acoustic signals are indirectly generated by motion of at least a part of said first toy.

6. A kit according to claim 1, wherein said toys have external forms matching said functions.

7. A kit according to claim 1, wherein said toys are operative to move in a manner matching said functions.

8. A kit according to claim 1, wherein said toys are operative to generate sounds in a manner matching said functions.

9. A kit according to claim 1, wherein said first function comprises a leader function, and wherein said second function comprises a following function, which function exhibits locomotion which follows locomotion of said first toy.

10. A kit according to claim 1, wherein said first function comprises a mother-emulating function and wherein said second function comprises a child-emulating function.

11. A kit according to claim 1, wherein said functions comprise different toy-soldier functions.

12. A kit according to claim 1, wherein said functions comprise emulations of different farm-animals.

13. A kit according to claim 1, wherein said first function comprises an emulation of a sheep-dog and wherein said second function comprises an emulation of a sheep.

14. A kit according to claim 1, wherein neither of said first and second functions designates one toy as a hierarchical superior of the other toy.

15. A kit according to claim 1, wherein each of the first and second functions comprises an emulation of a speaker in an interactive conversation between figures represented by the two toys.

16. A kit according to claim 1, wherein said second function exhibits a response to an exhibition of said first function.

17. A kit according to claim 16, wherein said response comprises a generation or modulation of locomotion of said second toy.

18. A kit according to claim 17, wherein said locomotion is directed towards said first toy.

19. A kit according to claim 17, wherein said locomotion is directed away from said first toy.

20. A kit according to claim 16, wherein said response comprises a modulation or generation of sound by said second toy.

21. A kit according to claim 16, wherein said response comprises a modulation or generation of light by said second toy.

22. A kit according to claim 16, wherein said response comprises a generation or modulation of motion of a segment of said second toy.

23. A kit according to claim 16, wherein said response is dependent on a relative position of said toys.

24. A kit according to claim 23, wherein said relative position is determined by said second toy analyzing said acoustic signals.

25. A kit according to claim 16, wherein said response is dependent on a relative orientation of at least one of said toys relative to the other one.

26. A kit according to claim 25, wherein said orientation is determined by said second toy analyzing said acoustic signals.

27. A kit according to claim 16, wherein said response is dependent on a functional state of at least one of said toys.

28. A kit according to claim 27, wherein said functional state comprises motion.

29. A kit according to claim 27, wherein said functional state is determined by said second toy analyzing said acoustic signals.

30. A kit according to claim 16, wherein said response is dependent on a functional state of the first toy.

31. A kit according to claim 16, wherein said response is dependent on a functional state of the second toy.

32. A kit according to claim 1, wherein said at least a second toy comprises at least two interacting child-safe toys.

33. A kit according to claim 1, wherein said at least a second toy comprises at least four interacting child-safe toys.

34. A kit according to claim 33, wherein said interacting toys interact in a linear network-configuration, each toy interacting with a previous toy in said network.

35. A kit according to claim 1, wherein said at least a second toy comprises at least seven interacting child safe toys.

36. A kit according to claim 1, wherein said at least a second toy comprises at least ten interacting child-safe toys.

37. A kit according to claim 1, wherein said acoustic signals are not coded.

38. A kit according to claim 1, wherein the first toy includes only a single transmitter for transmitting signals to the at least one second toy, the single transmitter being the acoustic sound transmitter.

39. A toy kit comprising:
   a first child-safe toy which indirectly generates acoustic signals, by motion of at least parts thereof; and
   at least a second child-safe toy which receives the acoustic signals through a microphone and analyzes the acoustic signals and exhibits a behavior, responsive to said analysis of said acoustic signals,
   whereby the motion that indirectly generates the acoustic signals is perceptible by a player of the first toy.

40. A kit according to claim 39, wherein said indirect acoustic signals are generated by a rattle attached to said first toy.

41. A kit according to claim 39, wherein said indirect acoustic signals are generated by a contact or a portion of said first toy with a ground surface which supports said first toy.

42. A kit according to claim 39, wherein said behavior comprises locomotion of said second toy.

43. A kit according to claim 39, wherein said first toy is further adapted to respond to said exhibited behavior of said second toy.

44. A kit according to claim 39, wherein said indirect acoustic signals are generated by squeezing said first toy.

45. A kit according to claim 39, wherein said indirect acoustic signals are generated in conjunction with movement evident to a user of the first toy.

46. A toy kit comprising:
a first toy adapted to generate acoustic signals and to exhibit a first behavior, and
at least one second toy comprising a microphone adapted to receive the signals from the first toy, and relay said acoustic signals received via said microphone to a signal analyzer adapted to determine from an analysis of said acoustic signals a relative position, relative orientation or relative motion of the first and second toys and to exhibit a second behavior, responsive to said relative position, orientation or motion determined responsive to said analysis of said received signals.

47. A kit according to claim 46, wherein said second toy transmits additional signals to said first toy, which said first toy exhibits a third behavior responsive to said additional signals.

48. A kit according to claim 46, wherein said second behavior comprises movement of the toy.

49. A kit according to claim 48, wherein the movement of the second toy comprises movement toward the first toy.

50. A kit according to claim 48, wherein the movement of the second toy comprises movement away from the first toy.

51. A kit according to claim 46, wherein said second behavior comprises generating sounds.

52. A kit according to claim 46, wherein said second toy receives said signals directly from said first toy.

53. A kit according to claim 46, wherein said second toy receives said signals via an intermediate device.

54. A kit according to claim 53, wherein said intermediate device comprises a third toy.

55. A kit according to claim 53, wherein said intermediate device comprises a computer.

56. A kit according to claim 53, wherein said intermediate device comprises at least two computers connected by a network.

57. A kit according to claim 53, wherein said first and second toys are operative to operate when separated by at least 2 meters.

58. A kit according to claim 53, wherein said first and second toys are operative to operate when separated by at least 5 meters.

59. A kit according to claim 53, wherein said first and second toys are operative to operate when separated by at least 100 meters.

60. A kit according to claim 46, wherein said signals comprise acoustic signals.

61. A kit according to claim 60, wherein said signals comprise ultrasonic signals.

62. A kit according to claim 60, wherein said signals comprise an overlay on toy-play related sounds.

63. A kit according to claim 46, wherein said signals comprise encoded signals.

64. A kit according to claim 46, wherein said signals are digitally encoded.

65. A kit according to claim 46, wherein said signals comprise electromagnetic signals.

66. A kit according to claim 65, wherein said signals comprise RF signals.

67. A kit according to claim 65, wherein said signals comprise light signals.

68. A kit according to claim 67, wherein said signals comprise visible light signals.

69. A kit according to claim 46, wherein said at least one second child-safe toy comprises at least four child-safe toys.

70. A kit according to claim 69, wherein said at least four toys exhibit interacting behavior.

71. A kit according to claim 46, wherein said first toy is covered with a soft fur.

72. A kit according to claim 46, wherein said first toy comprises an action figure.

73. A toy comprising of:
a toy portion;
a microphone; and
a signal responding portion comprising essentially of:
a power source; and
an integrated circuit which receives signals from said microphone, determines a respective location, a respective orientation or a respective motion of a remote toy responsive to the signals and controls said toy portion to respond to the received signals according to the determination.

74. A toy according to claim 73, comprising:
an interfacing circuit between said microphone and said integrated circuit; and
an interfacing circuit between said integrated circuit toy portion.

75. A toy according to claim 73, wherein said integrated circuit receives said signals, in analog form into a digital port thereof.

76. A toy kit comprising:
a first toy having a first function and also capable of generating acoustic signals; and
at least one second toy, comprising a microphone adapted to receive the acoustic signals and an analyzer adapted to analyze the received acoustic signal and perform a second function based upon an outcome of the analysis of the acoustic signals of the first toy,
wherein the first toy includes:
a detector adapted to detect the performing of the second function by the at least one second toy;
a timer adapted to measure a predetermined time from generating the acoustic signals; and
a controller adapted to actuate a third function, if the second function was not detected by the detector, within a predetermined time after generating the acoustic signals.

* * * * *